3,076,818
PRODUCTION OF BENZOFURANS
Archibald Robert Graham, Epsom, Dennis James George Long, Tadworth, and Denis Cheselden Quin, Middlesex, England, assignors to The Distillers Company Limited, Edinburgh, Scotland, a British company
No Drawing. Filed Nov. 2, 1959, Ser. No. 850,100
Claims priority, application Great Britain Nov. 20, 1958
9 Claims. (Cl. 260—346.2)

The present invention relates to the production of benzofurans, and in particular of benzofurans substituted in the heterocyclic ring with one or more alkyl groups.

According to the present invention the process for the production of benzofurans comprises condensing an aliphatic α-hydroxy carbonyl compound with a phenol. By the term "aliphatic α-hydroxy carbonyl compound" is meant in this specification a compound of the formula

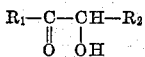

wherein $R_1$ and $R_2$ are hydrogen or alkyl, preferably lower alkyl, groups. Preferred compounds include hydroxyacetone, acetoin and butyroin.

A wide variety of phenols can be used in the process of the present invention. Preferred phenols include phenol itself, resorcinol, naphthol, alkylphenols such as the cresols, nitro-phenols, and ethers of polyhydric phenols containing at least one free hydroxy group such as resorcinol mono-methyl ether.

The chemical reactions involved in the process of the present invention may be illustrated by the following equations which relate to the production of 2-methylbenzofuran from hydroxyacetone and phenol; and to the production of 2,3-dipropylbenzofuran from butyroin and phenol.

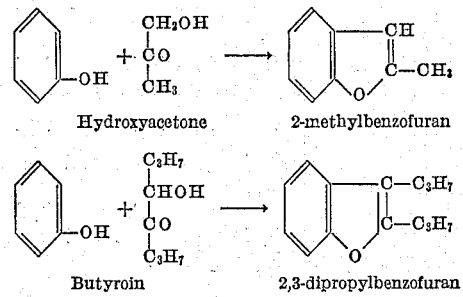

The proportions of the phenol and α-hydroxy carbonyl compound used in the condensation are not critical, but in general it is preferred to use an excess of the phenol, for instance a molar proportion of phenol to α-hydroxy carbonyl of at least 2:1.

The condensation may be carried out by contacting in the liquid or vapour phase the α-hydroxy carbonyl compound with the phenol at an elevated temperature, for instance at least 40° C. It is preferred to carry out the reaction at temperatures between 100° C. and 400° C. Reduced or increased pressures may be used if desired. Solvents may be used if desired in the case of a liquid phase process for instance, hydrocarbons such as the paraffin hydrocarbons, cumene, xylene, an dchlorobenzene and ethers such as dioxane and anisole; inert diluents such as nitrogen, carbon dioxide or the vapours of any of the solvents mentioned above may be used in a vapour phase process.

The condensation may be carried out if desired in the absence of any catalytic agents particularly if the higher temperatures in the range set forth are used, but it is preferred to carry out the reaction in the presence of a condensation catalyst such as activated alumina; acid- or alkali-treated pumice; acidic or basic ion-exchange resins; mineral acids such as hydrochloric acid, sulphuric acid and phosphoric acid especially in the presence of iron; and montmorillonite, also known as fuller's earth, bentonite, Florida earth, and attapulgite.

The amount of catalyst required will vary, the activity of the catalyst determining to a certain extent the amount to be used. In general proportions in the range of 0.005 to about 10% by weight based on the phenol are suitable.

The process of the present invention is further illustrated with reference to the following examples, in which the parts by weight and parts by volume bear the same relation to each other as do kilograms to litres.

*Example 1*

Phenol (100 parts by weight) and a 36% methanolic solution containing 2.7 parts by weight of hydroxyacetone were refluxed together for 30 minutes at 158° C. over 0.6 part by weight of a fuller's earth acid catalyst (marketed by the Fullers' Earth Union Limited, Redhill, Surrey, England, as Grade 237 SW).

The methanol was then allowed to distil over so that the kettle temperature rose to 180° C. and the solution was then refluxed a further 90 minutes at this temperature to complete the reaction.

The fuller's earth was filtered off and the reaction mixture was run into water containing slightly more than the stoichiometric amount of sodium hydroxide required to neutralise and dissolve the residual phenol. This alkaline solution was extracted with petroleum ether, B.P. 40–60° C., and the petroleum ether extract dried over a small amount of sodium sulphate.

The petroleum ether was then removed from the extract by evaporation and the residue was found by gas chromatography to comprise a mixture of a little residual petroleum ether and 0.95 part by weight of 2-methylbenzofuran, representing a yield of 18% of theory, based on the hydroxyacetone starting material.

*Example 2*

Phenol (200 parts by weight) and acetyl methyl carbinol (acetoin) (5 parts by weight) were refluxed for 20 minutes over 10 parts by weight of the fuller's earth acid catalyst used in Example 1 with removal of water as the phenol/water azeotrope. The liquid temperature rose from 100 to 180° C. The fuller's earth was then filtered off and the phenolic solution submitted to an efficient hydro-extractive distillation using 300 parts by volume of water, and 20 parts by weight of cumene as extractant. The distillate separated into two layers, and the upper cumene layer was separated off and washed with aqueous alkali to remove phenol, dried and distilled under reduced pressure to remove most of the cumene.

The residual oil was found to contain some cumene and 2.5 parts by weight of 2,3-dimethylbenzofuran, identified by gas chromatography and by its mass number on a mass spectrometer and its I.R. and U.V. spectra, representing a yield of 30% of theory on the acetoin starting material.

*Example 3*

Phenol (100 parts by weight) and butyryl-propyl carbinol (butyroin) (5 parts by weight) were refluxed for 45 minutes over 1 part by weight of the fuller's earth acid catalyst used in Example 1. On working up in a similar manner to Example 1, 2.4 parts by weight of 2,3-dipropylbenzofuran were obtained, representing a yield of 34% of theory on the butyroin starting material.

The identity of the 2,3-dipropylbenzofuran, which is believed to be a new compound was established by its mass number on a mass spectrometer (max. 201±1, calc. 202) a U.V. spectrum indicating the coumarone structure (sharp bands at 2,800 A. and 2870 A. and a stronger broader band at 2530 A.), and C, H analyses found:

(C=82.69, H=9.07, O=8.2; $C_{14}H_{18}O$ requires C=83.1, H=8.98, O=7.92). It had a boiling point of 120° C./4 mm. Hg; $n_D^{20}$ 1.5292.

*Example 4*

Phenol (548 parts by weight) containing 0.2% hydroxy acetone was vapourised at a rate of 200 parts by weight per hour through a tube containing commercial activated alumina (8-16 mesh, 225 parts by volume) maintained at 260° C. and the product was hydroextractively distilled as in Example 2. The distillate oil after removal of phenol and cumene contained 0.5 part by weight of 2-methylbenzofuran, estimated by its U.V. spectrum. The yield was thus about 25% of theory on the hydroxyacetone starting material.

*Example 5*

Resorcinol (50 parts by weight), hydroxyacetone (1.5 parts by weight in methanol) and fuller's earth (0.25 part by weight) were heated at 180° C. for 4 hours. The reaction product was cooled and poured into 300 parts by volume of cold water. The aqueous solution obtained was extracted with 80 parts by volume of benzene, and the benzene extract was washed with water, dried over anhydrous sodium sulphate, filtered and the solvent was removed. The residue was dissolved in N sodium hydroxide solution, extracted with ether and the ether extract discarded. The alkaline solution was neutralised with sulphuric acid and again extracted with ether; the ether extract was treated for the removal of the solvent and the residue was azeotropically dried with benzene to give a strong viscous oil. The oil was extracted with 40/60 petroleum ether, and after removal of the solvent, the liquid product (1.0 part by weight) was shown by infra-red analysis to be 2-methyl-4-hydroxybenzofuran, in a yield of 33% based on the hydroxyacetone starting material.

*Example 6*

β-Naphthol (20 parts by weight), hydroxyacetone (0.3 part by weight in methanol) and fuller's earth (0.2 part by weight) were heated at 180° C. for one hour. The reaction product was cooled, made alkaline with 2 N sodium hydroxide and extracted with ether. The ether extract was washed with water, dried over anhydrous sodium sulphate, and the solvent removed. The residue was dissolved in sodium hydroxide solution and extracted with 40/60 petroleum ether. The extract was washed with water, dried over sodium sulphate, filtered and the solvent removed to give 0.2 part by weight of 2-methyl-4,5-benzocoumarone (M.P. 54° C.) in a yield of 40% based on the hydroxyacetone.

*Example 7*

Phenol (400 parts by weight) was refluxed with 0.58 part by weight of a solution of 30% hydroxyacetone in methanol in the absence of a condensation catalyst. The conversion of the hydroxyacetone to 2-methylbenzofuran slowly increased to 32% in 36 hours, the progress of the reaction being determined spectroscopically. The reaction product was hydro-extractively distilled with water, using cumene as entrainer, to obtain an oil phase which was identified as 2-methylbenzofuran by gas chromatography.

The benzofurans produced by the process of the present invention are useful intermediates in the preparation of dyestuffs and also have uses as solvents.

We claim:

1. The process for the production of benzofurans which comprises condensing at a temperature of about 40°–400° C. an aliphatic α-hydroxy carbonyl compound of the formula

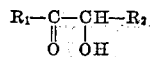

wherein R' is alkyl containing not more than 6 carbon atoms and $R_2$ is selected from the group consisting of hydrogen and an alkyl group containing not more than 6 carbon atoms, with a phenol selected from the group consisting of mono, di and polyhydric phenols, naphthols, alkyl substituted phenols, nitrophenols and ethers of polyhydric phenols containing at least one free hydroxy group on the aromatic portion of the molecule in the presence of a condensation catalyst selected from the group consisting of activated alumina, acid- and alkali-treated pumice, mineral acids and montmorillonite in amount between about 0.005 and 10% by weight based on the phenol.

2. The process as claimed in claim 1 wherein the reaction is carried out with an excess of the phenol over the aliphatic α-hydroxy carbonyl compound.

3. The process as claimed in claim 1 wherein the molar proportion of the phenol to carbonyl is at least 2:1.

4. A process which comprises heating phenol with hydroxyacetone at a temperature of 100–400° C. in the presence of fuller's earth as a catalyst in sufficient amount to catalyze reaction between said phenol and hydroxy acetone to produce 2-methylbenzofuran.

5. A process as in claim 1 in which the α-hydroxy carbonyl compound is α-hydroxy acetone and the aromatic hydroxy compound is phenol.

6. A process as in claim 1 in which the α-hydroxy carbonyl compound is acetoin and the aromatic hydroxy compound is phenol.

7. A process as in claim 1 in which the α-hydroxy carbonyl compound is butyroin and the aromatic hydroxy compound is phenol.

8. A process as in claim 1 in which the α-hydroxy carbonyl compound is α-hydroxy acetone and the aromatic hydroxy compound is resorcinol.

9. A process as in claim 1 in which the α-hydroxy carbonyl compound is α-hydroxy acetone and the aromatic hydroxy compound is β-naphthol.

References Cited in the file of this patent

UNITED STATES PATENTS 2,971,893   Hood ------------------ Feb. 14, 1961

OTHER REFERENCES

Brown et al.: J. Chem. Soc. (London), pp. 4305–4308 (October 1958).